United States Patent
Zhang et al.

(10) Patent No.: US 10,812,480 B2
(45) Date of Patent: Oct. 20, 2020

(54) METHOD AND DEVICE FOR VERIFYING VALIDITY OF IDENTITY OF ENTITY

(71) Applicant: China IWNCOMM Co., LTD., Xi'an, Shaanxi (CN)

(72) Inventors: Bianling Zhang, Shaanxi (CN); Zhiqiang Du, Shaanxi (CN); Qin Li, Shaanxi (CN); Xiaolong Lai, Shaanxi (CN); Weigang Tong, Shaanxi (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 243 days.

(21) Appl. No.: 15/766,322

(22) PCT Filed: Aug. 16, 2016

(86) PCT No.: PCT/CN2016/095470
§ 371 (c)(1),
(2) Date: Apr. 5, 2018

(87) PCT Pub. No.: WO2017/059737
PCT Pub. Date: Apr. 13, 2017

(65) Prior Publication Data
US 2018/0295131 A1    Oct. 11, 2018

(30) Foreign Application Priority Data
Oct. 10, 2015  (CN) .......................... 2015 1 0655011

(51) Int. Cl.
*H04L 29/06* (2006.01)
*H04L 9/32* (2006.01)

(52) U.S. Cl.
CPC .......... *H04L 63/0869* (2013.01); *H04L 29/06* (2013.01); *H04L 63/0807* (2013.01); *H04L 9/3247* (2013.01)

(58) Field of Classification Search
CPC ..... H04L 9/3247; H04L 29/06; H04L 9/3213; H04L 63/0807; H04L 63/0853; H04L 63/0876; H04L 63/0869
(Continued)

(56) References Cited

U.S. PATENT DOCUMENTS 8,316,237 B1 * 11/2012 Felsher ................. H04L 9/0825
                                                          380/282
8,356,179 B2 *  1/2013 Tie ........................ H04L 9/3213
                                                          713/170
(Continued)

FOREIGN PATENT DOCUMENTS

CN          1977513 A     6/2007
CN        101640593 A     2/2010
(Continued)

OTHER PUBLICATIONS

Office Action for Korean Application No. 10-2018-7011063, dated Aug. 6, 2019.
(Continued)

*Primary Examiner* — David J Pearson
*Assistant Examiner* — Badri Champakesan
(74) *Attorney, Agent, or Firm* — Wolf, Greenfield & Sacks, P.C.

(57) ABSTRACT

Provided are an entity identity validity verification method and device with multiple trusted third parties being involved. In the application, validity of identities of entities performing mutual identity validity verification can only be verified by different trusted third parties. During the verification process, the trusted third parties that are respectively trusted by the two entities interact with each other, and provide identity validity verification services for mutual identity validity verification between the entities, to complete the identity validity verification between the entities.

20 Claims, 3 Drawing Sheets

(58) Field of Classification Search
USPC .......................................................... 726/7
See application file for complete search history.

(56) References Cited

U.S. PATENT DOCUMENTS

| | | | |
|---|---|---|---|
| 2005/0125668 A1* | 6/2005 | Botz ..................... | G06F 21/445 713/171 |
| 2007/0016801 A1 | 1/2007 | Bade et al. | |
| 2007/0214357 A1 | 9/2007 | Baldus et al. | |
| 2009/0096584 A1* | 4/2009 | Gravelle ............... | H04L 9/3271 340/10.1 |
| 2009/0125996 A1* | 5/2009 | Guccione ................ | H04L 9/321 726/6 |
| 2011/0055561 A1 | 3/2011 | Lai et al. | |
| 2011/0078438 A1* | 3/2011 | Tie ........................ | H04L 9/3273 713/155 |
| 2011/0202766 A1* | 8/2011 | Lerner ................... | H04L 67/38 713/168 |
| 2012/0159169 A1 | 6/2012 | Lai et al. | |
| 2012/0167162 A1* | 6/2012 | Raleigh .................. | H04L 63/10 726/1 |
| 2012/0198240 A1 | 8/2012 | Tie et al. | |
| 2013/0067552 A1* | 3/2013 | Hawkes ............... | H04L 63/0876 726/7 |
| 2013/0227289 A1 | 8/2013 | Du et al. | |
| 2013/0232551 A1 | 9/2013 | Du et al. | |
| 2014/0181513 A1* | 6/2014 | Marek ................... | H04L 63/062 713/168 |
| 2015/0113275 A1* | 4/2015 | Kim ...................... | H04L 9/3278 713/169 |
| 2015/0200928 A1* | 7/2015 | Burch .................... | G06F 21/53 726/9 |
| 2015/0302187 A1* | 10/2015 | Verma .................... | G06F 21/60 726/9 |
| 2016/0364787 A1* | 12/2016 | Walker .................. | H04L 9/0891 |
| 2017/0064554 A1* | 3/2017 | Li .......................... | H04L 63/101 |
| 2018/0295131 A1* | 10/2018 | Zhang ..................... | H04L 29/06 |
| 2019/0116037 A1* | 4/2019 | Donaldson .............. | G06F 21/51 |
| 2019/0303915 A1* | 10/2019 | Hammad ............. | G06Q 20/425 |

FOREIGN PATENT DOCUMENTS

| | | |
|---|---|---|
| CN | 101662366 A | 3/2010 |
| CN | 101997688 A | 3/2011 |
| CN | 104618307 A | 5/2015 |
| EP | 2 472 770 A1 | 7/2012 |
| EP | 2 472 772 A1 | 7/2012 |
| EP | 2 639 998 A1 | 9/2013 |
| JP | 2002-507812 A | 3/2002 |
| JP | 2003-087242 A | 3/2003 |
| JP | 2004-280791 A | 10/2004 |
| JP | 2008-530919 A | 8/2008 |
| KR | 2012-0052404 A | 5/2012 |
| WO | WO 99/48242 A1 | 9/1999 |

OTHER PUBLICATIONS

Lekkas et al., User Requirements of Trusted Third Parties in Europe. Proceedings, User Identification and Privacy Protection Joint IFIP WG. Jun. 1999;8:229-42.
Office Action for Japanese Application No. 2018-517783, dated Feb. 18, 2019.
16853043.4, Oct. 5, 2018, Extended European Search Report.
International Search Report for Application No. PCT/CN2016/095470 dated Nov. 8, 2016.
Extended European Search Report dated Oct. 5, 2018 in connection with European Application No. 16853043.4.

* cited by examiner

METHOD AND DEVICE FOR VERIFYING VALIDITY OF IDENTITY OF ENTITY

The present application is a national phase application of PCT international patent application PCT/CN2016/095470, filed on Aug. 16, 2016 which claims the priority to Chinese Patent Application No. 201510655011.8, titled "METHOD AND DEVICE FOR VERIFYING VALIDITY OF IDENTITY OF ENTITY", filed on Oct. 10, 2015 with the Chinese State Intellectual Property Office, both of which are incorporated herein by reference in their entireties.

FIELD

The present disclosure relates to the field of network communications, and in particular to an entity identity validity verification method with multiple trusted third parties being involved and devices therefor.

BACKGROUND

Among existing methods for identity validity verification between entities, there is a type of method in which a trusted third party TTP is required to be involved and to provide verification services. In such method, a TTP that can be trusted by both identity validity verification parties is used to provide verification services for both parties being involved in identity validity verification and feed verification results back to both entities being involved in identity validity verification, thereby helping complete mutual identity validity verification between the entities.

However, those skilled in the art cannot be instructed to complete identity validity verification in some specific environments with the method. For example, the specific identity validity verification environment may include a case where mutual identity validity verification is required to be performed between the entities that respectively trust different trusted third parties TTPs and the trusted third parties are required to be involved and to provide verification services.

SUMMARY

In view of this, in order to solve the above technical problem mentioned in the background part, an entity identity validity verification method and devices therefor are provided according to the present disclosure, to be applied to an application scenario in which identity validity verification is performed with multiple trusted third parties TTPs being involved.

An entity identity validity verification method, involving an entity A, an entity B, a first trusted third party $TTP_A$ and a second trusted third party $TTP_B$, is provided. The $TTP_A$ is capable of verifying validity of an identity of the entity A, the $TTP_B$ is capable of verifying validity of an identity of the entity B, the entity A trusts the $TTP_A$ and the $TTP_B$, the entity B trusts the $TTP_B$. The method includes:

step 1) transmitting, by the entity B, a message 1 to the entity A, where the message 1 includes identity information $I_B$ of the entity B and a random number $R_B$ generated by the entity B;

step 2) transmitting, by the entity A, a message 2 to the $TTP_A$ after the entity A receives the message 1, where the message 2 includes identity information $I_A$ of the entity A, a random number $R_A$ generated by the entity A, $I_B$ and $R_B$;

step 3) after the $TTP_A$ receives the message 2 transmitted by the entity A, verifying, by the $TTP_A$, the identity of the entity A based on $I_A$ to acquire an identity verification result $Res_A$ of verifying the entity A, and transmitting, by the $TTP_A$, a message 3 to the $TTP_B$, where the message 3 includes a random number $R_{TPA}$ generated by the $TTP_A$ and a token TokenTPAB, where the token TokenTPAB includes $Res_A$, $R_A$, $R_B$, $R_B$ and a signature of the $TTP_A$, where signature objects of the signature of the $TTP_A$ include $R_A$, $I_B$, $Res_A$ and $R_B$;

step 4) after the $TTP_B$ receives the message 3 transmitted by the $TTP_A$, firstly verifying, by the $TTP_B$, the signature of the $TTP_A$ in TokenTPAB; after the signature of the $TTP_A$ passes the verification performed by the $TTP_B$, verifying, by the $TTP_B$, the identity of the entity B based on $I_B$ to acquire an identity verification result $Res_B$ of verifying the entity B, and transmitting, by the $TTP_B$, a message 4 to the $TTP_A$, where the message 4 includes a token TokenTPBA, where the token TokenTPBA includes $Res_A$, $Res_B$, a first signature of the $TTP_B$, a second signature of the $TTP_B$, and a third signature of the $TTP_B$, where objects of the first signature of the $TTP_B$ include $Res_A$ and $R_B$, objects of the second signature of the $TTP_B$ include $Res_B$ and $R_A$, and an object of the third signature of the $TTP_B$ includes $R_{TPA}$;

step 5) after the $TTP_A$ receives the message 4 transmitted by the $TTP_B$, verifying, by the $TTP_A$, the third signature of the $TTP_B$ in TokenTPBA; after the third signature of the $TTP_B$ passes the verification performed by the $TTP_A$, checking, by the $TTP_A$, whether $R_{TPA}$ acquired from the message 4 is the same as the random number $R_{TPA}$ in the message 3 transmitted by the $TTP_A$ to the $TTP_B$; if $R_{TPA}$ acquired from the message 4 is the same as the random number $R_{TPA}$ in the message 3 transmitted by the $TTP_A$ to the $TTP_B$, constructing a message 5 and transmitting the message 5 to the entity A by the $TTP_A$, where the message 5 includes a token TokenTA, where the token TokenTA includes $Res_A$, $Res_B$, the first signature of the $TTP_B$, and the second signature of the $TTP_B$;

step 6) after the entity A receives the message 5 from the $TTP_A$, firstly verifying, by the entity A, the second signature of the $TTP_B$ in TokenTA; after the second signature of the $TTP_B$ passes the verification performed by the entity A, checking, by the entity A, whether $R_A$ acquired from the message 5 is the same as the random number $R_A$ in the message 2 transmitted by the entity A to the $TTP_A$; if $R_A$ acquired from the message 5 is the same as the random number $R_A$ in the message 2 transmitted by the entity A to the $TTP_A$, determining, by the entity A, the validity of the identity of the entity B based on the verification result $Res_B$, and constructing a message 6 and transmitting the message 6 to the entity B by the entity A, where the message 6 includes the first signature of the $TTP_B$; and step 7) after the entity B receives the message 6, firstly verifying, by the entity B, the first signature of the $TTP_B$; after the first signature of the $TTP_B$ passes the verification performed by the entity B, checking, by the entity B, whether $R_B$ acquired from the message 6 is the same as the random number $R_B$ in the message 1 transmitted by the entity B to the entity A; if $R_B$ acquired from the message 6 is the same as the random number $R_B$ in the message 1 transmitted by the entity B to the entity A, determining, by the entity B, the validity of the identity of the entity A based on the verification result $Res_A$.

Devices corresponding to the entity identity validity verification method are further provided according to the present disclosure.

A first entity identity validity verification device for performing identity validity verification together with a second entity identity validity verification device with a first trusted third party device and a second trusted third party device being involved, is provided. The first entity identity validity verification device includes:
- a processing unit configured to generate a random number $R_A$;
- a storage unit configured to store identity information $I_A$ of the first entity identity validity verification device; and
- a transceiving unit configured to:
  - receive a message 1 transmitted by the second entity identity validity verification device and transmit a message 2 to the first trusted third party device, where the message 1 includes identity information $I_B$ of the second entity identity validity verification device and a random number $R_B$ generated by the second entity identity validity verification device, where the message 2 includes $I_A$, $R_A$, $I_B$ and $R_B$;
  - receive a message 5 transmitted by the first trusted third party device and transmit a message 6 to the second entity identity validity verification device, where the message 5 includes a token TokenTA, where the token TokenTA includes an identity verification result $Res_A$ of verifying the first entity identity validity verification device, an identity verification result $Res_B$ of verifying the second entity identity validity verification device, a first signature of the second trusted third party device, and a second signature of the second trusted third party device, where signature objects of the first signature of the second trusted third party device include $Res_A$ and $R_B$, signature objects of the second signature of the second trusted third party device include $Res_B$ and $R_A$, and where the message 6 includes the first signature of the second trusted third party device, where
- the processing unit is further configured to: verify the second signature of the second trusted third party device in TokenTA; after the second signature of the second trusted third party device passes verification performed by the first entity identity validity verification device, check whether $R_A$ acquired from the message 5 is the same as the random number $R_A$ in the message 2 transmitted by the first entity identity validity verification device to the first trusted third party device; if $R_A$ acquired from the message 5 is the same as the random number $R_A$ in the message 2 transmitted by the first entity identity validity verification device to the first trusted third party device, determine validity of an identity of the second entity identity validity verification device based on the verification result $Res_B$, and construct the message 6.

A second entity identity validity verification device for performing identity validity verification together with a first entity identity validity verification device with a first trusted third party device and a second trusted third party device being involved, is provided. The second entity identity validity verification device includes:
- a processing unit configured to generate a random number $R_B$;
- a storage unit configured to store identity information $I_B$ of the second entity identity validity verification device; and
- a transceiving unit configured to transmit a message 1 and receive a message 6 transmitted by the first entity identity validity verification device, where the message 1 includes $I_B$ and $R_B$, where the message 6 includes $R_B$ and a first signature of the second trusted third party device, where signature objects of the first signature of the second trusted third party device include $Res_A$ and $R_B$, where
- the processing unit is further configured to: verify the first signature of the second trusted third party device; after the first signature of the second trusted third party device passes verification performed by the second entity identity validity verification device, check whether $R_B$ acquired from the message 6 is the same as the random number $R_B$ in the message 1 transmitted by the second entity identity validity verification device to the entity A; if $R_B$ acquired from the message 6 is the same as the random number $R_B$ in the message 1, determine validity of an identity of the first entity identity validity verification device based on the verification result $Res_A$.

A first trusted third party device for being involved in identity validity verification between a first entity identity validity verification device and a second entity identity validity verification device together with a second trusted third party device, is provided. The first trusted third party device includes:
- a transceiving unit configured to receive a message 2 transmitted by the first entity identity validity verification device, where the message 2 includes identity information $I_A$ of the first entity identity validity verification device, a random number $R_A$ generated by the first entity identity validity verification device, identity information $I_B$ of the second entity identity validity verification device, and a random number $R_B$ generated by the second entity identity validity verification device; and
- a processing unit configured to verify an identity of the first entity identity validity verification device based on $I_A$ to acquire a verification result $Res_A$, where
- the transceiving unit is further configured to transmit a message 3 to the second trusted third party device, where the message 3 includes a random number $R_{TPA}$ generated by the first trusted third party device and a token TokenTPAB, where the token TokenTPAB includes the identity verification result ResA of verifying the first entity identity validity verification device, $R_A$, $I_B$, $R_B$, and a signature of the first trusted third party device, where signature objects of the signature of the first trusted third party device include $R_A$, $I_B$, $Res_A$ and $R_B$;
- the transceiving unit is further configured to receive a message 4 transmitted by the second trusted third party device, where the message 4 includes a token TokenTPBA, where the token TokenTPBA includes $Res_A$, an identity verification result $Res_B$ of verifying the second entity identity validity verification device, a first signature of the second trusted third party device, a second signature of the second trusted third party device and a third signature of the second trusted third party device, where signature objects of the first signature of the second trusted third party device include $Res_A$ and $R_B$, signature objects of the second signature of the second trusted third party device include $Res_B$ and $R_A$, and a signature object of the third signature of the second trusted third party device includes $R_{TP4}$;

the processing unit is further configured to: verify the third signature of the second trusted third party device in TokenTPBA; after the third signature of the second trusted third party device passes verification performed by the first trusted third party device, check whether $R_{TP4}$ acquired from the message 4 is the same as the random number $R_{TP4}$ in the message 3 transmitted by the first trusted third party device to the $TTP_B$; if $R_{TP4}$ acquired from the message 4 is the same as the random number $R_{TP4}$ in the message 3, construct a message 5, where the message 5 includes a token TokenTA, where the token TokenTA includes $Res_A$, $Res_B$, the first signature of the second trusted third party device, and the second signature of the second trusted third party device; and the transceiving unit is further configured to transmit the message 5 to the first entity identity validity verification device.

A second trusted third party device for being involved in identity validity verification between a first entity identity validity verification device and a second entity identity validity verification device together with a first trusted third party device, is provided.

The second trusted third party device includes:

a transceiving unit configured to receive a message 3 transmitted by the first trusted third party device, where the message 3 includes a token TokenTPAB and a random number $R_{TP4}$ generated by the first trusted third party device, where the token TokenTPAB includes an identity verification result ResA of verifying the first entity identity validity verification device, a random number $R_A$ generated by the first entity identity validity verification device, an identity identifier $I_B$ of the second entity identity validity verification device, a random number $R_B$ generated by the second entity identity validity verification device, and a signature of the first trusted third party device, where signature objects of the signature of the first trusted third party device include $R_A$, $I_B$, $Res_A$ and $R_B$; and a processing unit configured to: verify the first signature of the first trusted third party device in TokenTPAB, and then verify an identity of the entity B based on $I_B$ to acquire an identity verification result $Res_B$ of verifying the entity B, where the transceiving unit is further configured to transmit a message 4 to the first trusted third party device, where the message 4 includes a token TokenTPBA, where the token TokenTPBA includes $Res_A$, $Res_B$, a first signature of the second trusted third party device, a second signature of the second trusted third party device, and a third signature of the second trusted third party device, where signature objects of the first signature of the second trusted third party device include $Res_A$ and $R_B$, and signature objects of the second signature of the second trusted third party device include ResB and $R_A$, and a signature object of the third signature of the second trusted third party device includes $R_{TP4}$.

An identity validity verification method and devices therefor are provided according to present disclosure, in which validity of the identity of the entity A is capable of being verified by the $TTP_A$, validity of the identity of the entity B is capable of being verified by the $TTP_B$, the entity A trusts the $TTP_A$ and the $TTP_B$, the entity B trusts the $TTP_B$. According to the technical solution provided in the present disclosure, validity of identities of entities performing mutual identity validity verification can only be verified by different trusted third parties TTPs. During the identity validity verification process, the TTPs that are respectively trusted by the two entities interact with each other, and provide identity validity verification services for mutual identity validity verification between the entities, to complete the identity validity verification between the entities. According to the technical solution, the problem existing in the identity validity verification process in the case where the entities respectively trust different TTPs can be solved. The method can be applied to the application scenario in which entity identity validity verification is performed with multiple TTPs being involved, and fills in the technical gap in which the entity identity validity verification is performed without multiple TTPs being involved.

DETAILED DESCRIPTION OF EMBODIMENTS

The entity identity validity verification method according to the present disclosure involves an entity A, an entity B, a first trusted third party $TTP_A$ and a second trusted third party $TTP_B$. The $TTP_A$ is capable of verifying validity of an identity of the entity A, and the $TTP_B$ is capable of verifying validity of an identity of the entity B. The entity A trusts the $TTP_A$ and the $TTP_B$, and the entity B trusts the $TTP_B$. Connections between the entities involved by the method may be described as follows. The entity B is only connected to the entity A, the entity A is connected to the entity B and the first trusted third party $TTP_A$, the first trusted third party $TTP_A$ is connected to the entity A and the second trusted third party $TTP_B$, and the second trusted third party $TTP_B$ is only connected to the trusted third party $TTP_A$.

Embodiments of the present disclosure are described below in detail in conjunction with the drawings.

Figure 1:
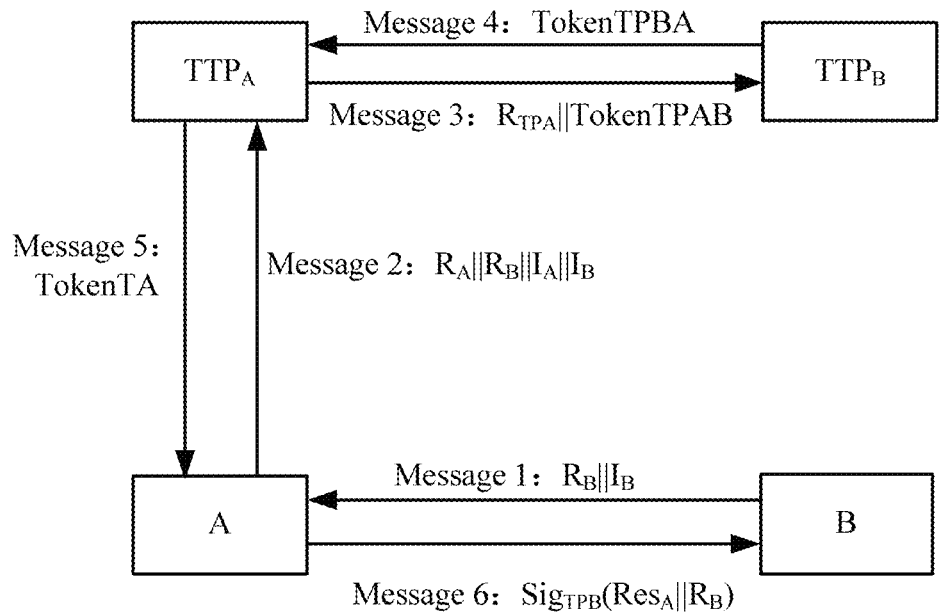
FIG. 1 is a schematic diagram showing flows of a method according to an embodiment of the present disclosure.

Referring to FIG. 1, flows of entity identity validity verification between the entity A and the entity B include the following steps 1) to 7).

In step 1), the entity B transmits a message 1 to the entity A. The message 1 includes identity information $I_B$ of the entity B and a random number $R_B$ generated by the entity B.

In step 2), after the entity A receives the message 1, the entity A transmits a message 2 to the $TTP_A$. The message 2 includes identity information $I_A$ of the entity A, a random number $R_A$ generated by the entity A, $I_B$ and $R_B$.

In step 3), after the $TTP_A$ receives the message 2 transmitted by the entity A, the $TTP_A$ verifies the identity of the entity A based on $I_A$ to acquire an identity verification result $Res_A$ of verifying the entity A, and transmits a message 3 to the $TTP_B$. The message 3 includes a random number $R_{TP4}$ generated by the $TTP_A$ and a token TokenTPAB. The TokenTPAB includes $Res_A$, $R_A$, $I_B$, $R_B$ and a signature of the $TTP_A$. Signature objects of the signature of the $TTP_A$ include $R_A$, $I_B$, $Res_A$ and $R_B$.

In step 4), after the $TTP_B$ receives the message 3 transmitted by the $TTP_A$, the $TTP_B$ firstly verifies the signature of the $TTP_A$ in TokenTPAB; after the signature of the $TTP_A$ passes the verification performed by the $TTP_B$, the $TTP_B$ verifies the identity of the entity B based on $I_B$ to acquire an identity verification result $Res_B$ of verifying the entity B, and the $TTP_B$ transmits a message 4 to the $TTP_A$. The message 4 includes a token TokenTPBA. The token TokenTPBA includes $Res_A$, $Res_B$, a first signature of the $TTP_B$, a second signature of the $TTP_B$, and a third signature of the $TTP_B$. Objects of the first signature of the $TTP_B$ include $Res_A$ and $R_B$, objects of the second signature of the $TTP_B$ include $Res_B$ and $R_A$, and an object of the third signature of the $TTP_B$ includes RTPA.

In step 5), after the $TTP_A$ receives the message 4 transmitted by the $TTP_B$, the $TTP_A$ verifies the third signature of the $TTP_B$ in TokenTPBA; after the third signature of the $TTP_B$ passes the verification performed by the $TTP_A$, the $TTP_A$ checks whether $R_{TPA}$ acquired from the message 4 is the same as the random number $R_{TPA}$ in the message 3 transmitted by the $TTP_A$ to the $TTP_B$; if $R_{TPA}$ acquired from the message 4 is the same as the random number $R_{TPA}$ in the message 3 transmitted by the $TTP_A$ to the $TTP_B$, the $TTP_A$ constructs a message 5 and transmits the message 5 to the entity A. The message 5 includes a token TokenTA. The token TokenTA includes $Res_A$, $Res_B$, the first signature of the $TTP_B$, and the second signature of the $TTP_B$.

In step 6), after the entity A receives the message 5 from the $TTP_A$, the entity A firstly verifies the second signature of the $TTP_B$ in TokenTA; after the second signature of the $TTP_B$ passes the verification performed by the entity A, the entity A checks whether RA acquired from the message 5 is the same as the random number $R_A$ in the message 2 transmitted by the entity A to the $TTP_A$; if $R_A$ acquired from the message 5 is the same as the random number $R_A$ in the message 2 transmitted by the entity A to the $TTP_A$, the entity A determines the validity of the identity of the entity B based on the verification result $Res_B$, and the entity A constructs a message 6 and transmits the message 6 to the entity B. The message 6 includes the first signature of the $TTP_B$.

In step 7), after the entity B receives the message 6, the entity B firstly verifies the first signature of the $TTP_B$; after the first signature of the $TTP_B$ passes the verification performed by the entity B, the entity B checks whether $R_B$ acquired from the message 6 is the same as the random number $R_B$ in the message 1 transmitted by the entity B to the entity A; if $R_B$ acquired from the message 6 is the same as the random number $R_B$ in the message 1 transmitted by the entity B to the entity A, the entity B determines the validity of the identity of the entity A based on the verification result $Res_A$.

Thus, both the entity A and the entity B complete the determination on validity of the identity of the other party, thereby realizing mutual identity validity verification.

Preferably, the $TTP_A$ verifying the identity of the entity A based on IA after the $TTP_A$ receives the message 2 transmitted by the entity A in step 3) may be performed as follows. In a case that IA is a distinguisher of the entity A, the $TTP_A$ extracts a public key $P_A$ of the entity A, and $Res_A$ includes $P_A$. In a case that IA is a certificate $Cert_A$ of the entity A, the $TTP_A$ checks validity of $Cert_A$, and $Res_A$ includes a validity state of $Cert_A$. If the $TTP_A$ is incapable of acquiring the public key or the validity of the certificate of the entity A, $Res_A$ includes content indicating failed verification.

Preferably, the $TTP_B$ firstly verifying the signature of the $TTP_A$ in TokenTPAB and then verifying the identity of the entity B based on $I_B$ after the $TTP_B$ receives the message 3 transmitted by the $TTP_A$ in step 4) may be performed as follows. In a case that $I_B$ is a distinguisher of the entity B, the $TTP_B$ extracts a public key $P_B$ of the entity B, and $Res_B$ includes $P_B$. In a case that $I_B$ is a certificate $Cert_B$ of the entity B, the $TTP_B$ checks validity of $Cert_B$, and $Res_B$ includes a validity state of $Cert_B$. If the $TTP_B$ is incapable of acquiring the public key or the validity of the certificate of the entity B, $Res_B$ includes content indicating failed verification.

As well-known technologies in the art, digital signature algorithms include a signature algorithm with message recovery, a signature algorithm without message recovery, and the like. In a case that a signature verifier is capable of recovering a target field when the signature verifier verifies a signature, the signature verifier may recover the target field directly from the signature after the signature passes verification performed by the signature verifier. In a case that the signature verifier is incapable of recovering the target field when the signature verifier verifies the signature, those skilled in the art usually may set that the target field is carried in a message, and the signature verifier may acquire the target field directly from the message. Preferably, the $TTP_A$ acquiring $R_{TPA}$ from the message 4 in step 5) may be performed as follows. In a case that the $TTP_A$ is capable of recovering $R_{TPA}$ from the third signature of the $TTP_B$ when the $TTP_A$ verifies the third signature of the $TTP_B$, the $TTP_A$ may recover $R_{TPA}$ directly from the signature after the signature passes verification performed by the $TTP_A$. In addition, in a case that the $TTP_A$ is incapable of recovering $R_{TPA}$ when the $TTP_A$ verifies the third signature, the message 4 further includes the $R_{TPA}$ field, and the $TTP_A$ may acquire $R_{TPA}$ directly from the message 4.

Further, the entity A acquiring $R_A$ from the message 5 in step 6) may be performed as follows. In a case that the entity A is capable of recovering $R_A$ from the second signature of the $TTP_B$ when the entity A verifies the second signature of the $TTP_B$, the entity A may recover $R_A$ directly from the second signature of the $TTP_B$ after the second signature of the $TTP_B$ passes verification performed by the entity A. In addition, in a case that the entity A is incapable of recovering $R_A$ when the entity A verifies the second signature, the message 5 further includes the $R_A$ field, and the entity A may acquire $R_A$ directly from the message 5.

Further, the entity B acquiring $R_B$ from the message 6 in step 7) may be performed as follows. In a case that the entity B is capable of recovering $R_B$ from the first signature of the $TTP_B$ when the entity B verifies the first signature of the $TTP_B$, the entity B may recover $R_B$ directly from the first signature of the $TTP_B$ after the first signature of the $TTP_B$ passes verification performed by the entity B. In addition, in a case that the entity B is incapable of recovering $R_B$ when the entity B verifies the first signature, the message 6 further includes the $R_B$ field, and the entity B may acquire $R_B$ directly from the message 6.

Specifically, in step 5), step 6), and step 7), if the signature does not pass the verification or it is determined that the random numbers are different from each other, a well-known process in the art, such as discarding a corresponding message or terminating the identity validity verification process, may be performed, which is not described in detail herein.

In addition, in another embodiment according to the present disclosure, the $TTP_A$ may not generate the random number $R_{TPA}$ in step 3), and the message 3 may not include $R_{TPA}$. In the subsequent step 4) and step 5), $R_{TPA}$ may be replaced with $R_A$. Specific method flows and specific implementation processes of the embodiment are the same as those of the embodiment described above, which are not repeated herein.

In this way, the $TTP_A$ is not required to generate any random number while security is hardly affected, thereby reducing calculation complexity of the $TTP_A$, and improving efficiency of the system.

Based on the entity identity validity verification method according to the present disclosure, there are further provided a first entity identity validity verification device, a second entity identity validity verification device, a first trusted third party device and a second trusted third party device according to the present disclosure, which are described below in detail in conjunction with the drawings.

Figure 2:
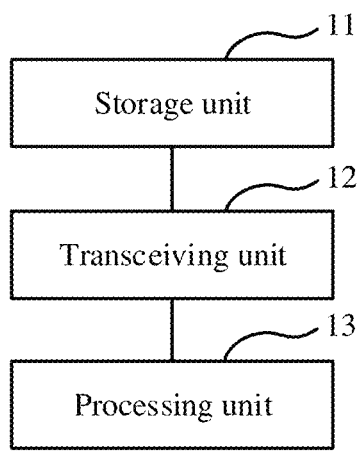
FIG. 2 is a schematic diagram showing a structure of a first entity identity validity verification device according to the present disclosure.

Referring to FIG. 2, a first entity identity validity verification device for performing identity validity verification together with the second entity identity validity verification device with the first trusted third party device and the second trusted third party device being involved, is provided. The first entity identity validity verification device includes a storage unit 11, a transceiving unit 12 and a processing unit 13.

The processing unit 13 is configured to generate a random number $R_A$.

The storage unit 11 is configured to store identity information IA of the first entity identity validity verification device.

The transceiving unit 12 is configured to receive a message 1 transmitted by the second entity identity validity verification device and transmit a message 2 to the first trusted third party device. The message 1 includes identity information $I_B$ of the second entity identity validity verification device, and a random number $R_B$ generated by the second entity identity validity verification device. The message 2 includes $I_A$, $R_A$, $I_B$ and $R_B$.

The transceiving unit 12 is further configured to receive a message 5 transmitted by the first trusted third party device and transmit a message 6 to the second entity identity validity verification device. The message 5 includes a token TokenTA. The token TokenTA includes an identity verification result $Res_A$ of verifying the first entity identity validity verification device, an identity verification result $Res_B$ of verifying the second entity identity validity verification device, a first signature of the second trusted third party device, and a second signature of the second trusted third party device. Signature objects of the first signature of the second trusted third party device include $Res_A$ and $R_B$, and signature objects of the second signature of the second trusted third party device include $Res_B$ and $R_A$. The message 6 includes the first signature of the second trusted third party device.

The processing unit 13 is further configured to: verify the second signature of the second trusted third party device in TokenTA; after the second signature of the second trusted third party device passes verification performed by the first entity identity validity verification device, check whether $R_A$ acquired from the message 5 is the same as the random number $R_A$ in the message 2 transmitted by the first entity identity validity verification device to the first trusted third party device; if $R_A$ acquired from the message 5 is the same as the random number $R_A$ in the message 2 transmitted by the first entity identity validity verification device to the first trusted third party device, determine validity of an identity of the second entity identity validity verification device based on the verification result $Res_B$, and construct the message 6.

Figure 3:
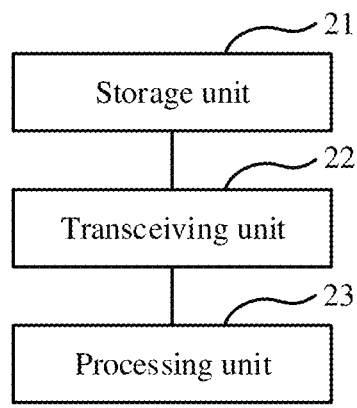
FIG. 3 is a schematic diagram showing a structure of a second entity identity validity verification device according to the present disclosure.

Referring to FIG. 3, a second entity identity validity verification device for performing identity validity verification together with the first entity identity validity verification device with the first trusted third party device and the second trusted third party device being involved, is provided. The second entity identity validity verification device includes a storage unit 21, a transceiving unit 22 and a processing unit 23.

The processing unit 23 is configured to generate a random number $R_B$.

The storage unit 21 is configured to store identity information $I_B$ of the second entity identity validity verification device.

The transceiving unit 22 is configured to transmit a message 1 and receive a message 6 transmitted by the first entity identity validity verification device. The message 1 includes $I_B$ and $R_B$. The message 6 includes $R_B$ and a first signature of the second trusted third party device. Signature objects of the first signature of the second trusted third party device include $Res_A$ and $R_B$.

The processing unit 23 is further configured to: verify the first signature of the second trusted third party device; after the first signature of the second trusted third party device passes verification performed by the second entity identity validity verification device, check whether $R_B$ acquired from the message 6 is the same as the random number $R_B$ in the message 1 transmitted by the second entity identity validity verification device to the entity A; if $R_B$ acquired from the message 6 is the same as the random number $R_B$ in the message 1, determine validity of an identity of the first entity identity validity verification device based on the verification result $Res_A$.

Figure 4:
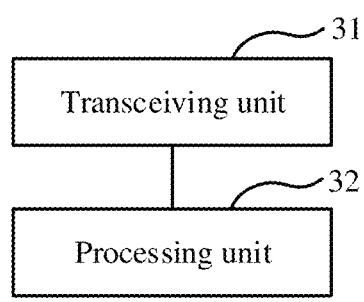
FIG. 4 is a schematic diagram showing a structure of a first trusted third party device according to the present disclosure.

Referring to FIG. 4, a first trusted third party device for being involved in identity validity verification between the first entity identity validity verification device and the second entity identity validity verification device together with the second trusted third party device, is provided. The first trusted third party device includes a transceiving unit 31 and a processing unit 32.

The transceiving unit 31 is configured to receive a message 2 transmitted by the first entity identity validity verification device. The message 2 includes identity information IA of the first entity identity validity verification device, a random number RA generated by the first entity identity validity verification device, identity information $I_B$ of the second entity identity validity verification device, and a random number $R_B$ generated by the second entity identity validity verification device.

The processing unit 32 is configured to verify an identity of the first entity identity validity verification device based on $I_A$ to acquire a verification result $Res_A$.

The transceiving unit 31 is further configured to transmit a message 3 to the second trusted third party device. The message 3 includes a random number $R_{TPA}$ generated by the first trusted third party device and a token TokenTPAB. The token TokenTPAB includes the identity verification result $Res_A$ of verifying the first entity identity validity verification device, $R_A$, $I_B$, $R_B$, and a signature of the first trusted third party device. Signature objects of the signature of the first trusted third party device include $R_A$, $I_B$, $Res_A$ and $R_B$.

The transceiving unit 31 is further configured to receive a message 4 transmitted by the second trusted third party device. The message 4 includes a token TokenTPBA. The token TokenTPBA includes $Res_A$, an identity verification result $Res_B$ of verifying the second entity identity validity verification device, a first signature of the second trusted third party device, a second signature of the second trusted third party device, and a third signature of the second trusted third party device. Signature objects of the first signature of the second trusted third party device include $Res_A$ and $R_B$, signature objects of the second signature of the second trusted third party device include $Res_B$ and $R_A$, and a signature object of the third signature of the second trusted third party device includes $R_{TPA}$.

The processing unit 32 is further configured to: verify the third signature of the second trusted third party device in TokenTPBA; after the third signature of the second trusted third party device passes verification performed by the first trusted third party device, check whether $R_{TPA}$ acquired from the message 4 is the same as the random number $R_{TPA}$ in the message 3 transmitted by the first trusted third party device to the $TTP_B$; if $R_{TPA}$ acquired from the message 4 is the same as the random number $R_{TPA}$ in the message 3, construct a message 5. The message 5 includes a token TokenTA. The token TokenTA includes $Res_A$, $Res_B$, the first signature of the second trusted third party device, and the second signature of the second trusted third party device.

The transceiving unit 31 is further configured to transmit the message 5 to the first entity identity validity verification device.

Preferably, in a process that the first trusted third party device verifies the identity of the first entity identity validity verification device based on IA after the first trusted third party device receives the message 2 transmitted by the first entity identity validity verification device, the processing unit 32 may be further configured to:

extract a public key $P_A$ of the first entity identity validity verification device in a case that IA is a distinguisher of the first entity identity validity verification device; and check validity of a certificate $Cert_A$ of the first entity identity validity verification device in a case that IA is the certificate $Cert_A$ of the first entity identity validity verification device.

Preferably, the first trusted third party device may not generate the random number $R_{TPA}$ in the message 3, and $R_{TPA}$ in the message 4 may be replaced with $R_A$.

Figure 5:
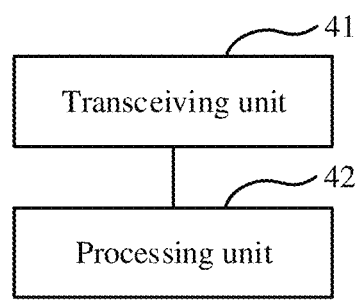
FIG. 5 is a schematic diagram showing a structure of a second trusted third party device according to the present disclosure.

Referring to FIG. 5, a second trusted third party device for being involved in identity validity verification between the first entity identity validity verification device and the second entity identity validity verification device together with the first trusted third party device, is provided. The second trusted third party device includes a transceiving unit 41 and a processing unit 42.

The transceiving unit 41 is configured to receive a message 3 transmitted by the first trusted third party device. The message 3 includes a token TokenTPAB and a random number $R_{TPA}$ generated by the first trusted third party device. The token TokenTPAB includes an identity verification result $Res_A$ of verifying the first entity identity validity verification device, a random number RA generated by the first entity identity validity verification device, an identity identifier $I_B$ of the second entity identity validity verification device, a random number $R_B$ generated by the second entity identity validity verification device, and a signature of the first trusted third party device. Signature objects of the signature of the first trusted third party device include $R_A$, $I_B$, $Res_A$ and $R_B$.

The processing unit 42 is configured to: verify the first signature of the first trusted third party device in TokenT-PAB, and then verify an identity of the entity B based on $I_B$ to acquire an identity verification result $Res_B$ of verifying the entity B.

The transceiving unit 41 is further configured to transmit a message 4 to the first trusted third party device. The message 4 includes a token TokenTPBA. The token TokenTPBA includes $Res_A$, $Res_B$, a first signature of the second trusted third party device, a second signature of the second trusted third party device, and a third signature of the second trusted third party device. Signature objects of the first signature of the second trusted third party device include $Res_A$ and $R_B$, signature objects of the second signature of the second trusted third party device include $Res_B$ and $R_A$, and a signature object of the third signature of the second trusted third party device includes $R_{TPA}$.

Preferably, in a process that the second trusted third party device firstly verifies the first signature of the first trusted third party device in TokenTPAB and then verifying the identity of the second entity identity validity verification device based on $I_B$ after the second trusted third party device receives the message 3 transmitted by the first trusted third party device, the processing unit may be further configured to:

extract a public key PB of the second entity identity validity verification device in a case that $I_B$ is a distinguisher of the second entity identity validity verification device; and check validity of a certificate $Cert_B$ of the second entity identity validity verification device in a case that IB is the certificate $Cert_B$ of the second entity identity validity verification device.

Preferably, the first trusted third party device may not generate the random number $R_{TPA}$ in the message 3, and $R_{TPA}$ in the message 4 may be replaced with $R_A$.

It should be noted that the devices according to the present disclosure correspond to the entities in the method embodiment according to the present disclosure, respectively. Specifically, the first entity identity validity verification device includes the entity A, the second entity identity validity verification device includes the entity B, the first trusted third party device includes the trusted third party $TTP_A$, and the second trusted third party device includes the trusted third party $TTP_B$. Therefore, a system formed by the devices according to the present disclosure with reference to FIG. 1 can implement the method according to the present disclosure. It should be understood by those skilled in the art that the specific configuration of each device has been shown in the device embodiment, and operation details thereof also correspond to the method embodiment, which are not described in detail herein.

It should be understood by those skilled in the art that the embodiments of the present disclosure may be implemented as a method, a system or a computer program product. Therefore, the present disclosure may be implemented by only hardware embodiments, only software embodiments or embodiments combining software with hardware. Alternatively, the present disclosure may be implemented as computer program products implemented on one or more computer available storage mediums (including but not limited to a magnetic disk memory, CD-ROM and an optical memory or the like) including computer available program codes.

The present disclosure is described with reference to flowcharts and/or block diagrams of the methods, devices (systems) and computer program products according to the present disclosure. It should be understood that, each flow and/or block in the flowcharts and/or block diagrams and a combination of flows and/or blocks in the flowcharts and/or block diagrams may be implemented by computer program instructions. The computer program instructions may be provided to a general-purpose computer, a dedicated computer, an embedded processor or processors of other programmable data processing devices to generate a machine, such that the instructions executed by the computer or the processors of the other programmable data processing devices generate a device for implementing functions specified in one or more flows of the flowcharts and/or one or more blocks of the block diagrams.

The computer program instructions may also be stored in a computer readable memory which can guide the computer or other programmable data processing devices to operate in a certain manner, such that the instructions stored in the computer readable memory generate a product including an instruction device which implements functions specified in one or more flows of the flowcharts and/or one or more blocks of the block diagrams.

The computer program instructions may also be loaded to the computer or other programmable data processing devices, such that the computer or other programmable devices perform a series of operation steps to generate processing implemented by the computer, and thus the instructions executed on the computer or other programmable devices provide steps for implementing the functions specified in one or more flows of the flowcharts and/or one or more blocks of the block diagrams.

Although the preferred embodiments of the present disclosure are described, those skilled in the art may make additional changes and modifications to the embodiments once they know the basic creative concepts. Therefore, the appended claims are intended to be explained as including the preferred embodiments and all changes and modifications falling within the scope of the present disclosure.

Apparently, those skilled in the art may make various changes and variations to the present disclosure without departing from the spirit and scope of the present disclosure. In this case, if the changes and variations of the present disclosure fall within the scope of the claims of the present disclosure and equivalent technologies thereof, the present disclosure is intended to include the changes and variations.

The invention claimed is:

1. An entity identity validity verification method, involving an entity A, an entity B, a first trusted third party $TTP_A$ and a second trusted third party $TTP_B$, wherein the $TTP_A$ is capable of verifying validity of an identity of the entity A, the $TTP_B$ is capable of verifying validity of an identity of the entity B, the entity A trusts the $TTP_A$ and the $TTP_B$, the entity B trusts the $TTP_B$, and wherein the method comprises:

step 1) transmitting, by the entity B, a message 1 to the entity A, wherein the message 1 comprises identity information $I_B$ of the entity B and a random number $R_B$ generated by the entity B;

step 2) transmitting, by the entity A, a message 2 to the $TTP_A$ after the entity A receives the message 1, wherein the message 2 comprises identity information IA of the entity A, a random number $R_A$ generated by the entity A, the $I_B$ and the $R_B$;

step 3) after the $TTP_A$ receives the message 2 transmitted by the entity A, verifying, by the $TTP_A$, the identity of the entity A based on the IA to acquire an identity verification result $Res_A$ of verifying the entity A, and transmitting, by the $TTP_A$, a message 3 to the $TTP_B$, wherein the message 3 comprises a random number $R_{TPA}$ generated by the $TTP_A$ and a token TokenTPAB, wherein the token TokenTPAB comprises the $Res_A$, the $R_A$, the $I_B$, the $R_B$ and a signature of the $TTP_A$, wherein signature objects of the signature of the $TTP_A$ comprise the $R_A$, the $I_B$, the $Res_A$ and the $R_B$;

step 4) after the $TTP_B$ receives the message 3 transmitted by the $TTP_A$, firstly verifying, by the $TTP_B$, the signature of the $TTP_A$ in the TokenTPAB; after the signature of the $TTP_A$ passes the verification performed by the $TTP_B$, verifying, by the $TTP_B$, the identity of the entity B based on the $I_B$ to acquire an identity verification result $Res_B$ of verifying the entity B, and transmitting, by the $TTP_B$, a message 4 to the $TTP_A$, wherein the message 4 comprises a token TokenTPBA, wherein the token TokenTPBA comprises the $Res_A$, the $Res_B$, a first signature of the $TTP_B$, a second signature of the $TTP_B$, and a third signature of the $TTP_B$, wherein objects of the first signature of the $TTP_B$ comprise the $Res_A$ and the $R_B$, objects of the second signature of the $TTP_B$ comprise the $Res_B$ and the $R_A$, and an object of the third signature of the $TTP_B$ comprises the $R_{TPA}$;

step 5) after the $TTP_A$ receives the message 4 transmitted by the $TTP_B$, verifying, by the $TTP_A$, the third signature of the $TTP_B$ in the TokenTPBA; after the third signature of the $TTP_B$ passes the verification performed by the $TTP_A$, checking, by the $TTP_A$, whether the $R_{TPA}$ acquired from the message 4 is the same as the random number $R_{TPA}$ in the message 3 transmitted by the $TTP_A$ to the $TTP_B$; if the $R_{TPA}$ acquired from the message 4 is the same as the random number $R_{TPA}$ in the message 3 transmitted by the $TTP_A$ to the $TTP_B$, constructing a message 5 and transmitting the message 5 to the entity A by the $TTP_A$, wherein the message 5 comprises a token TokenTA, wherein the token TokenTA comprises the $Res_A$, the $Res_B$, the first signature of the $TTP_B$, and the second signature of the $TTP_B$;

step 6) after the entity A receives the message 5 from the $TTP_A$, firstly verifying, by the entity A, the second signature of the $TTP_B$ in the TokenTA; after the second signature of the $TTP_B$ passes the verification performed by the entity A, checking, by the entity A, whether the $R_A$ acquired from the message 5 is the same as the random number $R_A$ in the message 2 transmitted by the entity A to the $TTP_A$; if the $R_A$ acquired from the message 5 is the same as the random number $R_A$ in the message 2 transmitted by the entity A to the $TTP_A$, determining, by the entity A, the validity of the identity of the entity B based on the verification result $Res_B$, and constructing a message 6 and transmitting the message 6 to the entity B by the entity A, wherein the message 6 comprises the first signature of the $TTP_B$; and step 7) after the entity B receives the message 6, firstly verifying, by the entity B, the first signature of the $TTP_B$; after the first signature of the $TTP_B$ passes the verification performed by the entity B, checking, by the entity B, whether the $R_B$ acquired from the message 6 is the same as the random number $R_B$ in the message 1 transmitted by the entity B to the entity A; if the $R_B$ acquired from the message 6 is the same as the random number $R_B$ in the message 1 transmitted by the entity B to the entity A, determining, by the entity B, the validity of the identity of the entity A based on the verification result $Res_A$.

2. The entity identity validity verification method according to claim 1, wherein the $TTP_A$ verifying the identity of the entity A based on the IA after the $TTP_A$ receives the message 2 transmitted by the entity A in step 3) comprises:

in a case that the IA is a distinguisher of the entity A, extracting, by the $TTP_A$, a public key $P_A$ of the entity A, wherein the $Res_A$ comprises the $P_A$; and in a case that the IA is a certificate $Cert_A$ of the entity A, checking, by the $TTP_A$, validity of the $Cert_A$, wherein the $Res_A$ comprises a validity state of the $Cert_A$; wherein if the $TTP_A$ is incapable of acquiring the public key $P_A$ of the entity A or the validity of the certificate of the entity A, the $Res_A$ comprises content indicating failed verification.

3. The entity identity validity verification method according to claim 1, wherein the $TTP_B$ firstly verifying the signature of the $TTP_A$ in the TokenTPAB and then verifying the identity of the entity B based on the $I_B$ after the $TTP_B$ receives the message 3 transmitted by the $TTP_A$ in step 4) comprises:

in a case that the $I_B$ is a distinguisher of the entity B, extracting, by the $TTP_B$, a public key $P_B$ of the entity B, wherein the $Res_B$ comprises the $P_B$; and in a case that the $I_B$ is a certificate $Cert_B$ of the entity B, checking, by the $TTP_B$, validity of the $Cert_B$, wherein the $Res_B$ comprises a validity state of the $Cert_B$; wherein if the $TTP_B$ is incapable of acquiring the public key $P_B$ of the entity B or the validity of the certificate of the entity B, the $Res_B$ comprises content indicating failed verification.

4. The entity identity validity verification method according to claim 1, wherein the $TTP_A$ acquiring the $R_{TPA}$ from the message 4 in step 5) comprises:

recovering, by the $TTP_A$, the $R_{TPA}$ directly from the third signature of the $TTP_B$ after the third signature of the $TTP_B$ passes verification performed by the $TTP_A$, in a case that the $TTP_A$ is capable of recovering the $R_{TPA}$ from the third signature of the $TTP_B$ when the $TTP_A$ verifies the third signature of the $TTP_B$; and acquiring, by the $TTP_A$, the $R_{TPA}$ directly from the message 4 comprising a field of the $R_{TPA}$, in a case that the $TTP_A$ is incapable of recovering the $R_{TPA}$ when the $TTP_A$ verifies the third signature;

the entity A acquiring the $R_A$ from the message 5 in step 6) comprises:

recovering, by the entity A, the $R_A$ directly from the second signature of the $TTP_B$ after the second signature of the $TTP_B$ passes verification performed by the entity A, in a case that the entity A is capable of recovering the $R_A$ from the second signature of the $TTP_B$ when the entity A verifies the second signature of the $TTP_B$; and acquiring, by the entity A, the $R_A$ directly from the message 5 comprising a field of the $R_A$, in a case that the entity A is incapable of recovering the $R_A$ when the entity A verifies the second signature; and the entity B acquiring the $R_B$ from the message 6 in step 7) comprises:

recovering, by the entity B, the $R_B$ directly from the first signature of the $TTP_B$ after the first signature of the $TTP_B$ passes verification performed by the entity B, in a case that the entity B is capable of recovering the $R_B$ from the first signature of the $TTP_B$ when the entity B verifies the first signature of the $TTP_B$; and acquiring, by the entity B, the $R_B$ directly from the message 6 comprising a field of the $R_B$ an $R_B$ field, in a case that the entity B is incapable of recovering the $R_B$ when the entity B verifies the first signature.

5. The entity identity validity verification method according to claim 1, wherein the $TTP_A$ does not generate the random number $R_{TPA}$ in step 3), and the $R_{TPA}$ in steps 4) and 5) is replaced with the $R_A$.

6. A first entity identity validity verification device for performing identity validity verification together with a second entity identity validity verification device with a first trusted third party device and a second trusted third party device being involved, the first entity identity validity verification device comprising:

a processing unit configured to generate a random number $R_A$;

a storage unit configured to store identity information IA of the first entity identity validity verification device; and a transceiving unit configured to:

receive a message 1 transmitted by the second entity identity validity verification device and transmit a message 2 to the first trusted third party device, wherein the message 1 comprises identity information $I_B$ of the second entity identity validity verification device and a random number $R_B$ generated by the second entity identity validity verification device, wherein the message 2 comprises the $I_A$, the $R_A$, the $I_B$ and the $R_B$;

receive a message 5 transmitted by the first trusted third party device and transmit a message 6 to the second entity identity validity verification device, wherein the message 5 comprises a token TokenTA, wherein the token TokenTA comprises an identity verification result $Res_A$ of verifying the first entity identity validity verification device, an identity verification result $Res_B$ of verifying the second entity identity validity verification device, a first signature of the second trusted third party device, and a second signature of the second trusted third party device, wherein signature objects of the first signature of the second trusted third party device comprise the $Res_A$ and the $R_B$, signature objects of the second signature of the second trusted third party device comprise the $Res_B$ and the $R_A$, and wherein the message 6 comprises the first signature of the second trusted third party device, wherein the processing unit is further configured to: verify the second signature of the second trusted third party device in the TokenTA; after the second signature of the second trusted third party device passes verification performed by the first entity identity validity verification device, check whether the $R_A$ acquired from the message 5 is the same as the random number $R_A$ in the message 2 transmitted by the first entity identity validity verification device to the first trusted third party device; if the $R_A$ acquired from the message 5 is the same as the random number $R_A$ in the message 2 transmitted by the first entity identity validity verification device to the first trusted third party device, determine validity of an identity of the second entity identity validity verification device based on the verification result the $Res_B$, and construct the message 6.

7. A second entity identity validity verification device for performing identity validity verification together with a first entity identity validity verification device with a first trusted third party device and a second trusted third party device being involved, the second entity identity validity verification device comprising:

a processing unit configured to generate a random number $R_B$;

a storage unit configured to store identity information $I_B$ of the second entity identity validity verification device; and a transceiving unit configured to transmit a message 1 and receive a message 6 transmitted by the first entity identity validity verification device, wherein the message 1 comprises the $I_B$ and the $R_B$, wherein the message 6 comprises the $R_B$ and a first signature of the second trusted third party device, wherein signature objects of the first signature of the second trusted third party device comprise $Res_A$ and the $R_B$, wherein the processing unit is further configured to: verify the first signature of the second trusted third party device; after the first signature of the second trusted third party device passes verification performed by the second entity identity validity verification device, check whether the $R_B$ acquired from the message 6 is the same as the random number $R_B$ in the message 1 transmitted by the second entity identity validity verification device to the entity A; if the $R_B$ acquired from the message 6 is the same as the random number $R_B$ in the message 1, determine validity of an identity of the first entity identity validity verification device based on the verification result $Res_A$.

8. A first trusted third party device for being involved in identity validity verification between a first entity identity validity verification device and a second entity identity validity verification device together with a second trusted third party device, the first trusted third party device comprising:

a transceiving unit configured to receive a message 2 transmitted by the first entity identity validity verification device, wherein the message 2 comprises identity information $I_A$ of the first entity identity validity verification device, a random number $R_A$ generated by the first entity identity validity verification device, identity information $I_B$ of the second entity identity validity verification device, and a random number $R_B$ generated by the second entity identity validity verification device; and a processing unit configured to verify an identity of the first entity identity validity verification device based on the $I_A$ to acquire a verification result $Res_A$, wherein the transceiving unit is further configured to transmit a message 3 to the second trusted third party device, wherein the message 3 comprises a random number $R_{TPA}$ generated by the first trusted third party device and a token TokenTPAB, wherein the token TokenTPAB comprises the identity verification result $Res_A$ of verifying the first entity identity validity verification device, the $R_A$, the $I_B$, the $R_B$, and a signature of the first trusted third party device, wherein signature objects of the signature of the first trusted third party device comprise the $R_A$, the $I_B$, the $Res_A$ and the $R_B$;

the transceiving unit is further configured to receive a message 4 transmitted by the second trusted third party device, wherein the message 4 comprises a token TokenTPBA, wherein the token TokenTPBA comprises the $Res_A$, an identity verification result $Res_B$ of verifying the second entity identity validity verification device, a first signature of the second trusted third party device, a second signature of the second trusted third party device and a third signature of the second trusted third party device, wherein signature objects of the first signature of the second trusted third party device comprise the $Res_A$ and the $R_B$, signature objects of the second signature of the second trusted third party device comprise the $Res_B$ and the $R_A$, and a signature object of the third signature of the second trusted third party device comprises the $R_{TPA}$;

the processing unit is further configured to: verify the third signature of the second trusted third party device in the TokenTPBA; after the third signature of the second trusted third party device passes verification performed by the first trusted third party device, check whether the $R_{TPA}$ acquired from the message 4 is the same as the random number $R_{TPA}$ in the message 3 transmitted by the first trusted third party device to the $TTP_B$; if the $R_{TPA}$ acquired from the message 4 is the same as the random number $R_{TPA}$ in the message 3, construct a message 5, wherein the message 5 comprises a token TokenTA, wherein the token TokenTA comprises the $Res_A$, the $Res_B$, the first signature of the second trusted third party device, and the second signature of the second trusted third party device; and the transceiving unit is further configured to transmit the message 5 to the first entity identity validity verification device.

9. The first trusted third party device according to claim 8, wherein in a process that the first trusted third party device verifies the identity of the first entity identity validity verification device based on the $I_A$ after the first trusted third party device receives the message 2 transmitted by the first entity identity validity verification device, the processing unit is further configured to:

extract a public key $P_A$ of the first entity identity validity verification device in a case that the $I_A$ is a distinguisher of the first entity identity validity verification device; and check validity of a certificate $Cert_A$ of the first entity identity validity verification device in a case that the $I_A$ is the certificate $Cert_A$ of the first entity identity validity verification device.

10. A second trusted third party device for being involved in identity validity verification between a first entity identity validity verification device and a second entity identity validity verification device together with a first trusted third party device, the second trusted third party device comprising:

a transceiving unit configured to receive a message 3 transmitted by the first trusted third party device, wherein the message 3 comprises a token TokenTPAB and a random number $R_{TPA}$ generated by the first trusted third party device, wherein the token TokenTPAB comprises an identity verification result $Res_A$ of verifying the first entity identity validity verification device, a random number $R_A$ generated by the first entity identity validity verification device, an identity identifier $I_B$ of the second entity identity validity verification device, a random number $R_B$ generated by the second entity identity validity verification device, and a signature of the first trusted third party device, wherein signature objects of the signature of the first trusted third party device comprise the $R_A$, the $I_B$, the $Res_A$ and the $R_B$; and a processing unit configured to: verify the first signature of the first trusted third party device in the TokenTPAB, and then verify an identity of the entity B based on the $I_B$ to acquire an identity verification result $Res_B$ of verifying the entity B, wherein the transceiving unit is further configured to transmit a message 4 to the first trusted third party device, wherein the message 4 comprises a token TokenTPBA, wherein the token TokenTPBA comprises the $Res_A$, the $Res_B$, a first signature of the second trusted third party device, a second signature of the second trusted third party device, and a third signature of the second trusted third party device, wherein signature objects of the first signature of the second trusted third party device comprise the $Res_A$ and the $R_B$, and signature objects of the second signature of the second trusted third party device comprise the $Res_B$ and the $R_A$, and a signature object of the third signature of the second trusted third party device comprises the $R_{TP4}$.

11. The second trusted third party device according to claim 10, wherein in a process that the second trusted third party device firstly verifies the first signature of the first trusted third party device in the TokenTPAB and then verifying the identity of the second entity identity validity verification device based on the $I_B$ after the second trusted third party device receives the message 3 transmitted by the first trusted third party device, the processing unit is further configured to:

extract a public key $P_B$ of the second entity identity validity verification device in a case that the $I_B$ is a distinguisher of the second entity identity validity verification device; and check validity of a certificate $Cert_B$ of the second entity identity validity verification device in a case that the $I_B$ is the certificate $Cert_B$ of the second entity identity validity verification device.

12. The first entity identity validity verification device according to claim 6, wherein the messages 1 to 6 occur in the following order: the message 1, the message 2, the message 3, the message 4, the message 5, and the message 6.

13. The first trusted third party device according to claim 8, wherein the first trusted third party device does not generate the random number $R_{TP4}$ in the message 3, and the $R_{TP4}$ in the message 4 is replaced with the $R_A$.

14. The entity identity validity verification method according to claim 2, wherein the $TTP_A$ does not generate the random number $R_{TP4}$ in step 3), and the $R_{TP4}$ in steps 4) and 5) is replaced with the $R_A$.

15. The entity identity validity verification method according to claim 3, wherein the $TTP_A$ does not generate the random number $R_{TP4}$ in step 3), and the $R_{TP4}$ in steps 4) and 5) is replaced with the $R_A$.

16. The entity identity validity verification method according to claim 4, wherein the $TTP_A$ does not generate the random number $R_{TP4}$ in step 3), and the $R_{TP4}$ in steps 4) and 5) is replaced with the $R_A$.

17. The second entity identity validity verification device according to claim 7, wherein the messages 1 to 6 occur in the following order: the message 1, the message 2, the message 3, the message 4, the message 5, and the message 6.

18. The first trusted third party device according to claim 9, wherein the first trusted third party device does not generate the random number $R_{TP4}$ in the message 3, and the $R_{TP4}$ in the message 4 is replaced with the $R_A$.

19. The second trusted third party device according to claim 10, wherein the first trusted third party device does not generate the random number $R_{TP4}$ in the message 3, and the $R_{TP4}$ in the message 4 is replaced with the $R_A$.

20. The second trusted third party device according to claim 11, wherein the first trusted third party device does not generate the random number $R_{TP4}$ in the message 3, and the $R_{TP4}$ in the message 4 is replaced with the $R_A$.

* * * * *